J. S. BIRCH.
Gun-Wiper.
No. 210,235. Patented Nov. 26, 1878.
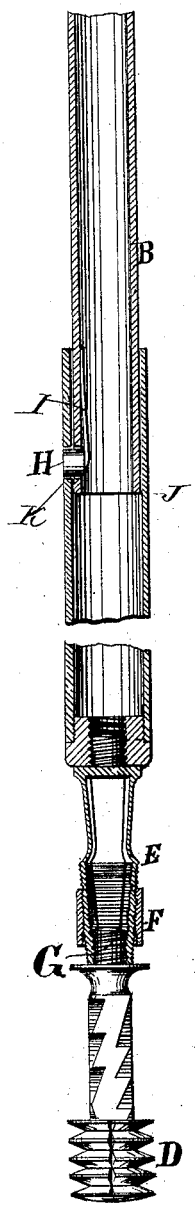
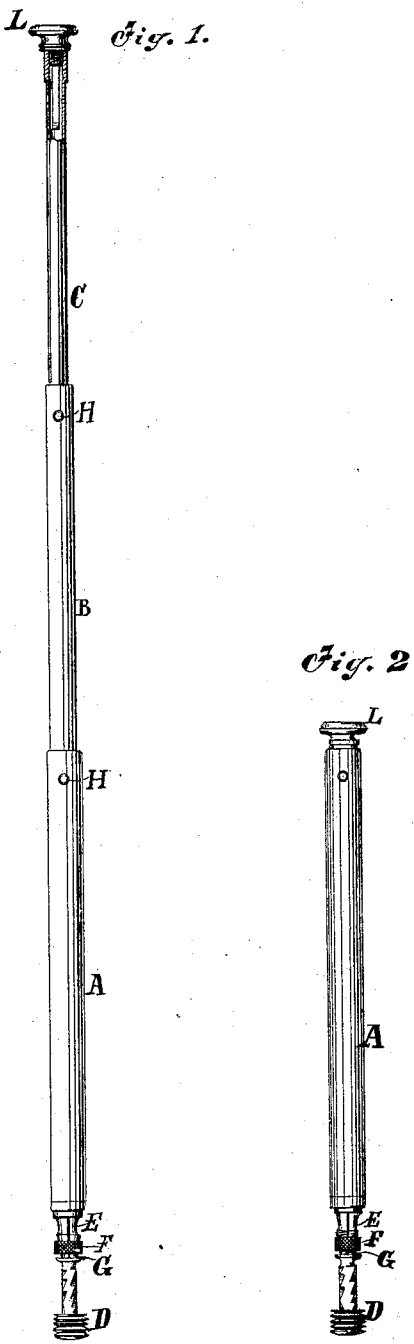
Witnesses.
A. P. Thayer
H. S. Morgan
Inventor.
John S. Birch

UNITED STATES PATENT OFFICE.

JOHN S. BIRCH, OF ORANGE, NEW JERSEY.

IMPROVEMENT IN GUN-WIPERS.

Specification forming part of Letters Patent No. 210,235, dated November 26, 1878; application filed April 22, 1878.

*To all whom it may concern:*

Be it known that I, JOHN S. BIRCH, a resident of Orange, Essex county, and State of New Jersey, have invented new and useful Improvements in Gun-Wipers, of which the following is a specification:

My invention consists of an improved method of connecting the wiping-head to the rod, whereby the variations in the sizes of the screw-shanks of different heads will not interfere with the connecting of different heads with the same rod as it now does; and it also consists, in combination therewith, in so connecting the sections of the rod that the tendency to disconnect when the rod is turned backward is avoided, and the rod may be more readily adjusted.

The wiping-heads are necessarily made detachable from the rod, to enable it to be used for bores of different sizes by attaching heads of different sizes, and, as the screw-shanks are not made in standard sizes, it frequently happens that when a head has been bought for a bore of different size it will not screw onto the rod. I therefore propose to use an expansion chuck-nut on the rod for connecting the wiping-head, which may be adjusted to fit the different sizes of screw-shanks of wiping-heads. The rods are also necessarily made of sections, detachably connected together to facilitate the arranging of them in suitably compact form, to permit of carrying them about conveniently. Together with this expansion chuck-nut I propose to make the rod of telescopic tubes with spring-stud fastenings, whereby the contraction and extension of the rod may be effected without detaching the sections of the rod one from the other, thus making a much more convenient and desirable rod than those now in use.

Figure 1 is a side elevation of my improved gun-wiper extended for use. Fig. 2 is an elevation of it in the contracted condition for carrying, and Fig. 3 is a sectional elevation.

A, B, and C represent the short tubes forming the rod, and being connected together in telescopic arrangement. D is the wiping-head, and E the expanding chuck-nut by which the head D is connected to the section A of the rod.

The nut consists of a long tapered split tube, with inside and outside screw-threads capable of expanding and contracting, and having a screw-collar, F, for contracting it to fit different-sized shanks G of the wiping-heads, which connect by screwing into the nut, and, besides, the collar F clamps the nut on the shank G so tightly that the wipers may be turned backward freely in wiping the gun without unscrewing.

H represents the spring-studs by which the telescopic tube-sections of the rod are locked when the rod is extended for use, said studs being mounted on a spring, I, fastened to the inside of the inside tube, and projecting through a hole, J, in the same tube to which they are fastened, and springing into a hole, K, in the outer tube when drawn out. The stops spring into the holes to fasten the rod; but they will be pressed back by the finger or thumb-nail to unfasten it.

I make a screw-socket in the upper end of section C of the rod suitable for screwing the wiping-head D in when detached from the chuck, or together with the chuck if desired, so that I may attach a cloth wiper when desired; and to close the socket when not so used I fit a screw-driver, L, in it.

Having thus described my invention, what I claim, and desire to secure by Letters Patent, is—

1. The combination, with the rod of a gun-wiper, of the wiping-head D, having screw-shank G, and the tapered split and expanding chuck-nut E, having the contracting collar F, substantially as described.

2. The improved gun-wiper herein described, consisting of the telescopic tubes A, B, and C, with spring-studs H I, expanding chuck-nut E, contracting collar F, and the wiping-head D, all combined and arranged substantially as described.

JOHN S. BIRCH.

Witnesses:
A. P. THAYER,
W. J. MORGAN.